(12) United States Patent
Glahn et al.

(10) Patent No.: US 8,109,717 B2
(45) Date of Patent: Feb. 7, 2012

(54) GAS TURBINE ENGINE SYSTEMS INVOLVING HYDROSTATIC FACE SEALS WITH INTEGRATED BACK-UP SEALS

(75) Inventors: Jorn A. Glahn, Manchester, CT (US); Peter M. Munsell, Granby, CT (US)

(73) Assignee: United Technologies Corp., Hartford, CT (US)

( * ) Notice: Subject to any disclaimer, the term of this patent is extended or adjusted under 35 U.S.C. 154(b) by 1208 days.

(21) Appl. No.: 11/840,636

(22) Filed: Aug. 17, 2007

(65) Prior Publication Data

US 2009/0047123 A1 Feb. 19, 2009

(51) Int. Cl.
*F04D 29/08* (2006.01)

(52) U.S. Cl. .................. 415/174.2; 415/174.4
(58) Field of Classification Search .............. 415/168.2, 415/168.4, 171.1, 173.7, 174.2, 174.3, 174.4, 415/174.5
See application file for complete search history.

(56) References Cited

U.S. PATENT DOCUMENTS

| | | | |
|---|---|---|---|
| 2,545,916 A | 3/1951 | Clark | |
| 3,501,245 A * | 3/1970 | Ivanko | 184/6.11 |
| 4,103,899 A | 8/1978 | Turner | |
| 4,477,088 A * | 10/1984 | Picard | 277/379 |
| 4,687,346 A | 8/1987 | Suciu | |
| 5,137,284 A | 8/1992 | Holder | |
| 5,174,584 A | 12/1992 | Lahrman | |
| 5,180,173 A | 1/1993 | Kimura | |
| 5,284,347 A | 2/1994 | Pope | |
| 5,975,537 A | 11/1999 | Turnquist et al. | |
| 6,145,840 A | 11/2000 | Pope | |
| 6,311,983 B1 * | 11/2001 | Burcham | 277/370 |
| 6,341,782 B1 | 1/2002 | Etsion | |
| 6,565,095 B2 * | 5/2003 | Meacham | 277/408 |
| 6,676,369 B2 | 1/2004 | Brauer | |
| 6,758,477 B2 | 7/2004 | Brauer et al. | |
| 7,175,388 B2 * | 2/2007 | Labbé et al. | 415/174.5 |
| 2004/0207158 A1 | 10/2004 | Agrawal et al. | |
| 2007/0007730 A1 | 1/2007 | Garrison et al. | |
| 2007/0085278 A1 | 4/2007 | Davis et al. | |
| 2007/0149031 A1 | 6/2007 | Martin et al. | |
| 2008/0018054 A1 | 1/2008 | Herron et al. | |

FOREIGN PATENT DOCUMENTS

| | | |
|---|---|---|
| EP | 1348898 A1 | 10/2003 |
| EP | 1780450 A1 | 5/2007 |
| EP | 1798455 A1 | 6/2007 |
| EP | 1852573 A2 | 11/2007 |
| GB | 1174207 | 12/1969 |

OTHER PUBLICATIONS

The Apr. 21, 2011 European Search Report for Counterpart European Application No. 08252699.

* cited by examiner

*Primary Examiner* — Nathaniel Wiehe
(74) *Attorney, Agent, or Firm* — Kinney & Lange, P.A.

(57) ABSTRACT

Gas turbine engine systems involving hydrostatic face seals with back-up seals are provided. In this regard, a representative seal assembly for a gas turbine engine includes: a hydrostatic seal having a seal face and a seal runner; and a back-up seal; wherein, in a normal mode of operation of the hydrostatic seal, interaction of the seal face and the seal runner maintains a pressure differential within the gas turbine engine and, in a failure mode of operation of the hydrostatic seal, the back-up seal maintains a pressure differential within the gas turbine engine.

11 Claims, 5 Drawing Sheets

GAS TURBINE ENGINE SYSTEMS INVOLVING HYDROSTATIC FACE SEALS WITH INTEGRATED BACK-UP SEALS

BACKGROUND

1. Technical Field

The disclosure generally relates to gas turbine engines.

2. Description of the Related Art

A gas turbine engine typically maintains pressure differentials between various components during operation. These pressure differentials are commonly maintained by various configurations of seals. In this regard, labyrinth seals oftentimes are used in gas turbine engines. As is known, labyrinth seals tend to deteriorate over time. By way of example, a labyrinth seal can deteriorate due to rub interactions from thermal and mechanical growths, assembly tolerances, engine loads and maneuver deflections. Unfortunately, such deterioration can cause increased flow consumption resulting in increased parasitic losses and thermodynamic cycle loss.

SUMMARY

Gas turbine engine systems involving hydrostatic face seals with back-up seals are provided. In this regard, an exemplary embodiment of a seal assembly for a gas turbine engine comprises: a hydrostatic seal having a seal face and a seal runner; and a back-up seal; wherein, in a normal mode of operation of the hydrostatic seal, interaction of the seal face and the seal runner maintains a pressure differential within the gas turbine engine and, in a failure mode of operation of the hydrostatic seal, the back-up seal maintains a pressure differential within the gas turbine engine.

An exemplary embodiment of a turbine assembly for a gas turbine engine comprises: a turbine having a hydrostatic seal, formed by a seal face and a seal runner, and a back-up seal; wherein, in a normal mode of operation of the hydrostatic seal, interaction of the seal face and the seal runner maintains a pressure differential within the gas turbine engine and, in a failure mode of operation of the hydrostatic seal, the back-up seal maintains a pressure differential within the gas turbine engine.

An exemplary embodiment of a gas turbine engine comprises: a compressor; a shaft interconnected with the compressor; and a turbine operative to drive the shaft, the turbine having a hydrostatic seal, formed by a seal face and a seal runner, and a back-up seal; wherein, in a normal mode of operation of the hydrostatic seal, interaction of the seal face and the seal runner maintains a pressure differential within the gas turbine engine and, in a failure mode of operation of the hydrostatic seal, the back-up seal maintains a pressure differential within the gas turbine engine.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving hydrostatic face seals with back-up seals are provided, several exemplary embodiments of which will be described in detail. In this regard, hydrostatic face seals can be used at various locations of a gas turbine engine, such as in association with a low-pressure turbine. Notably, a hydrostatic seal is a seal that uses balanced opening and closing forces to maintain a desired separation between a seal face and a corresponding seal runner. However, use of such a seal can be problematic, particularly when carbon is used to form the seal face. Notably, pressure fluctuations and/or vibrations could cause undesired contact between the seal face and a corresponding seal runner that can cause damage to the seal, e.g., carbon fracture. To mitigate the potential consequence of a damaged hydrostatic face seal, a back-up seal can be provided.

Figure 1:
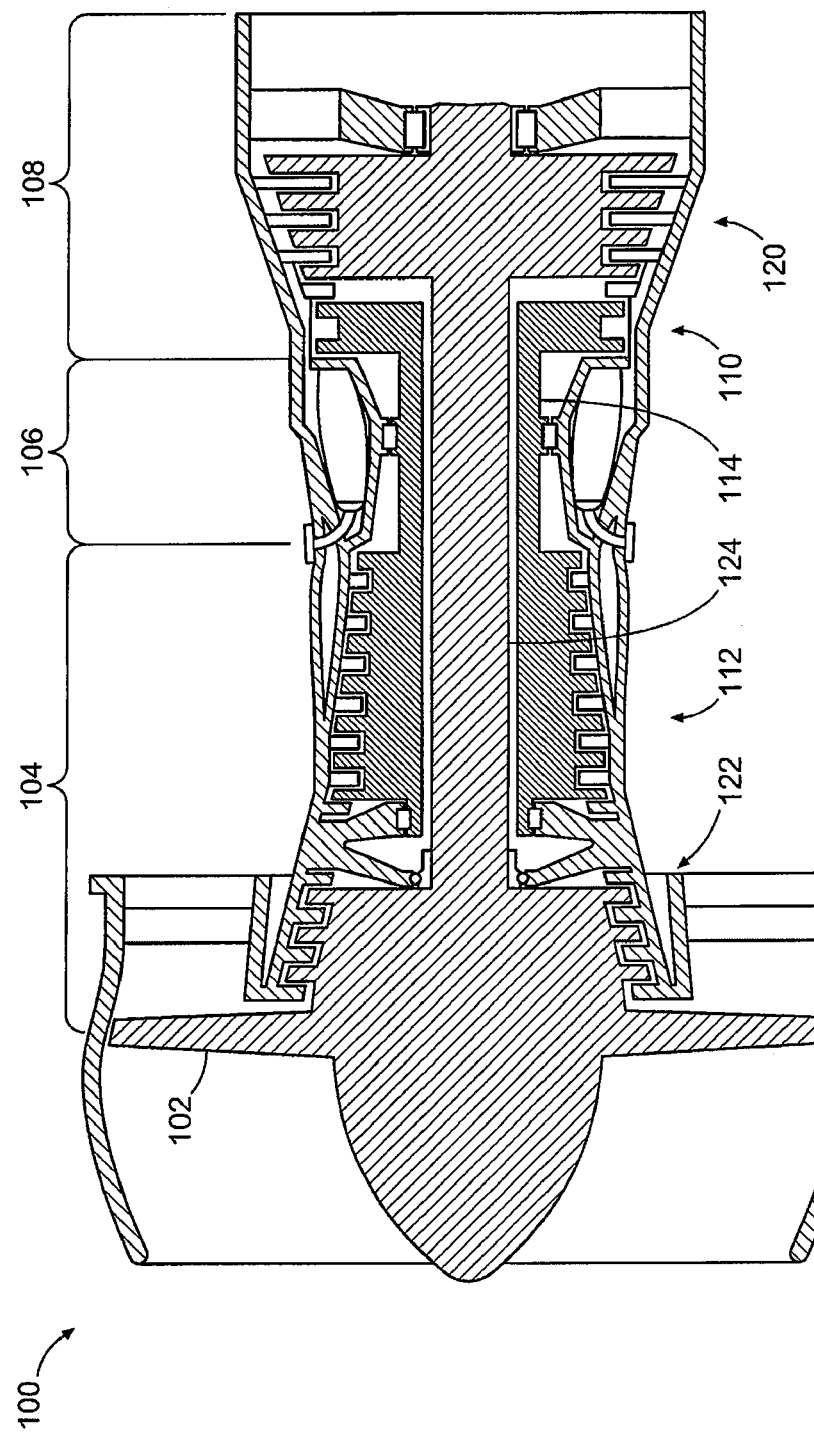
FIG. 1 is a schematic diagram depicting an exemplary embodiment of a gas turbine engine.

FIG. 1 is a schematic diagram depicting an exemplary embodiment of a gas turbine engine. As shown in FIG. 1, engine 100 is configured as a turbofan that incorporates a fan 102, a compressor section 104, a combustion section 106 and a turbine section 108. Although the embodiment of FIG. 1 is configured as a turbofan, there is no intention to limit the concepts described herein to use with turbofans, as various other configurations of gas turbine engines can be used.

Engine 100 is a dual spool engine that includes a high-pressure turbine 110 interconnected with a high-pressure compressor 112 via a shaft 114, and a low-pressure turbine 120 interconnected with a low-pressure compressor 122 via a shaft 124. Note that the low-pressure turbine 120 will be described in greater detail later with respect to FIGS. 4 and 5. It should also be noted that although various embodiments are described as incorporating hydrostatic face seals in low-pressure turbines, such seals are not limited only to use with low-pressure turbines.

Figure 2:
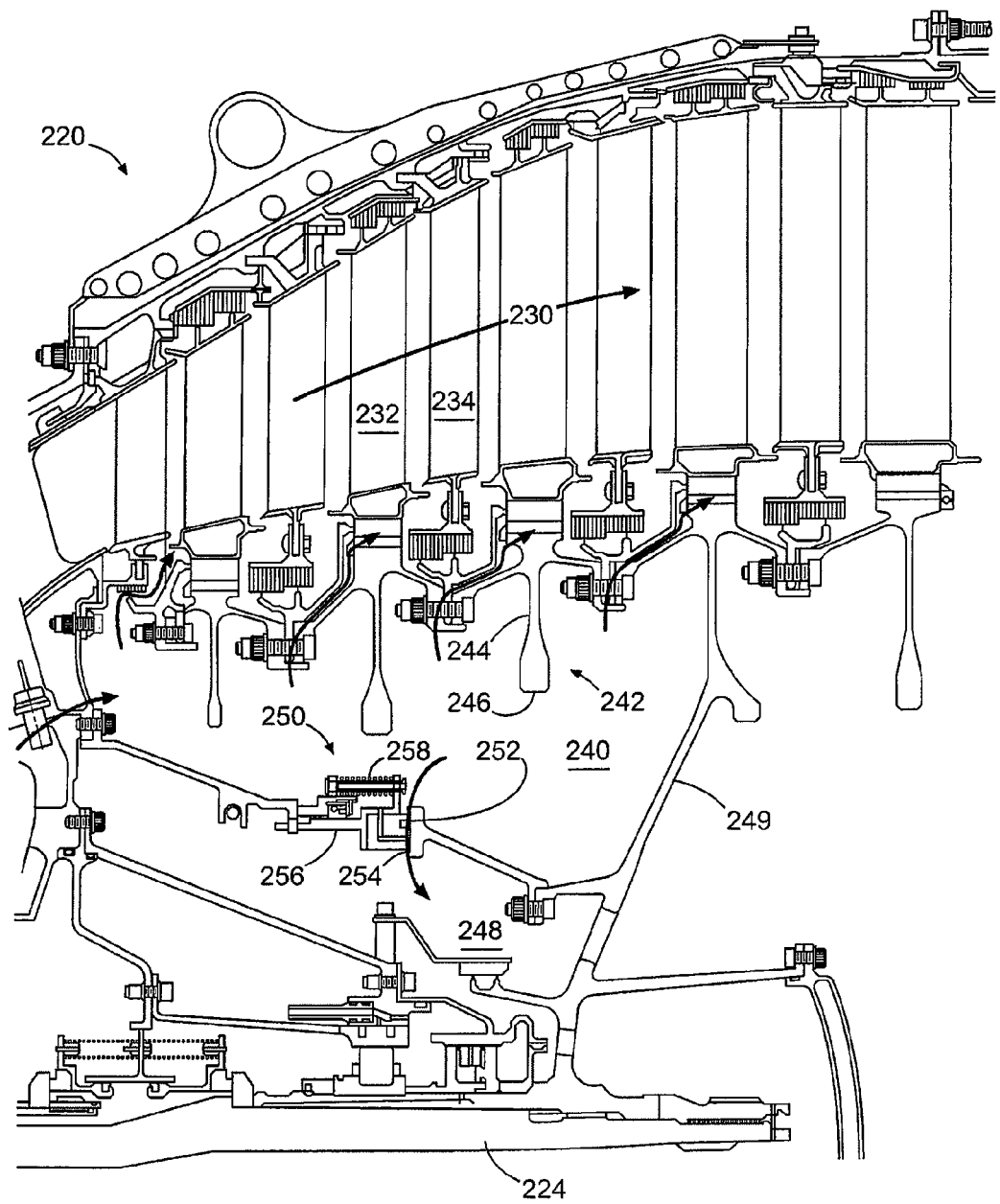
FIG. 2 is a schematic diagram depicting a portion of an exemplary embodiment of a low-pressure turbine incorporating a hydrostatic face seal.

FIG. 2 schematically depicts an embodiment of a low-pressure turbine that incorporates a primary hydrostatic face seal without a back-up seal installed. As shown in FIG. 2, low-pressure turbine 220 defines a primary gas flow path 230 along which multiple rotating blades (e.g., blade 232) and stationary vanes (e.g., vane 234) are located. Notably, the blades are mounted to turbine disks, the respective webs and bores of which extend into a high-pressure cavity 240. For instance, disk 242 includes a web 244 and a bore 246, each of which extends into cavity 240.

A relatively lower-pressure cavity 248 is oriented between high-pressure cavity 240 and turbine hub 249, with a hydrostatic seal 250 being provided to maintain a pressure differential between the high-pressure cavity and the lower-pressure cavity. Note that the arrows depict representative locations at which the higher-pressure gas attempts to leak from the high-pressure cavity.

Hydrostatic seal 250 is configured as a lift-off seal incorporating a seal face 252 and a seal runner 254. In operation, the seal face intermittently contacts the seal runner. By way of example, contact between the seal face and the seal runner can occur during sub-idle conditions and/or during transient conditions. However, during normal operating conditions, the seal face and the seal runner should not contact each other.

In this regard, the seal face is positioned by a carrier 256 that can translate axially with respect to the seal runner. A spring 258 is biased to urge the carrier so that the seal face contacts the seal runner. In operation, contact between the seal face and the seal runner is maintained until gas pressure in the high-pressure cavity is adequate to overcome the biasing force, thereby separating the seal face from the seal runner.

Since the embodiment of FIG. 2 is configured as a lift-off seal (i.e., at least intermittent contact is expected), materials forming the surfaces that will contact each other are selected, at least in part, for their durability. In this regard, a material comprising carbon can be used as a seal face material. It should be noted, however, that carbon can fracture or otherwise be damaged due to unwanted contact (e.g., excessively forceful contact) between the seal face and the seal runner as may be caused by unintended pressure fluctuations and/or vibrations, for example. Unfortunately, such damage may result in failure of the primary seal as depicted schematically in FIG. 3.

Figure 3:
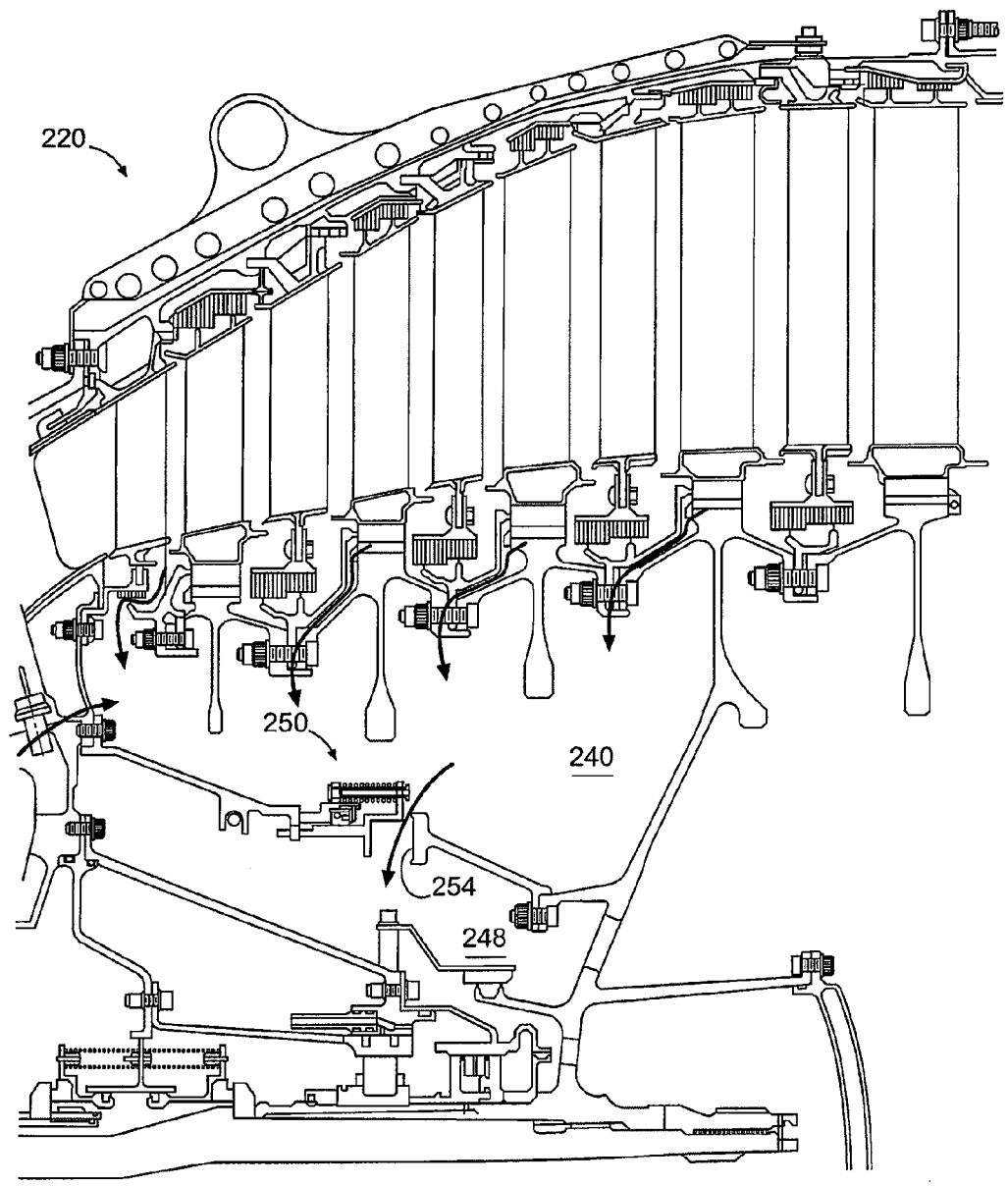
FIG. 3 is a schematic diagram showing the embodiment of FIG. 2, with the seal face exhibiting a failure.

In FIG. 3, an unintended failure of the seal face is depicted. Thus, the seal face is no longer capable of adequately maintaining a pressure differential between the high pressure cavity 240 and the lower pressure cavity 248. Notably, a seal face may no longer be capable of adequately maintaining a pressure differential based on one or more other conditions, such as a stuck-open failure. A stuck-open failure can occur, for example, due to a faulty biasing spring and/or a jammed carrier.

Figure 4:
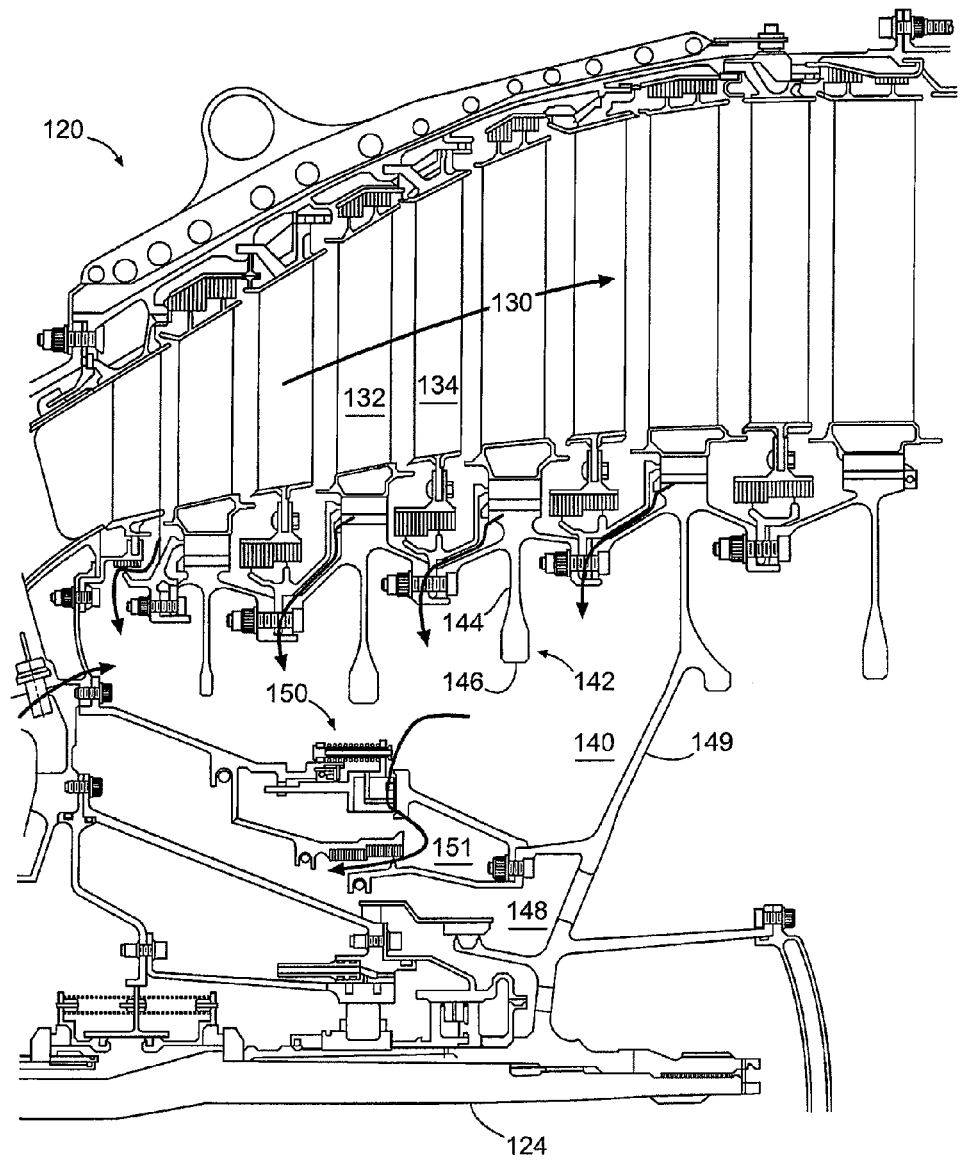
FIG. 4 is a schematic diagram depicting a portion of the low-pressure turbine of FIG. 1, showing detail of the hydrostatic face seal with back-up seal.
Figure 5:
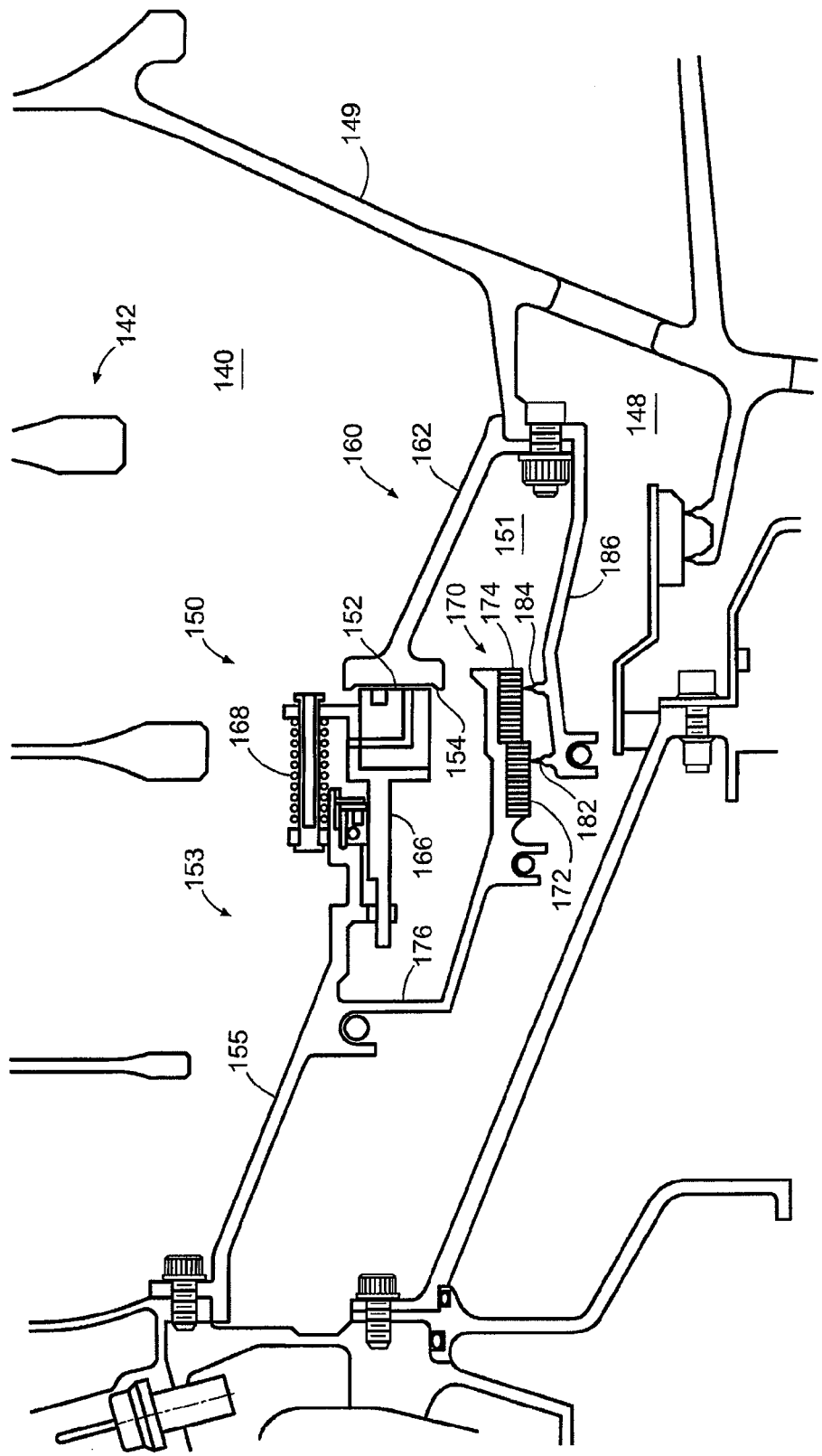
FIG. 5 is a schematic diagram showing detail of the embodiment of the hydrostatic face seal with back-up seal of FIG. 4.

In this regard, FIGS. 4 and 5 schematically depict an exemplary embodiment of a low-pressure turbine that incorporates a hydrostatic face seal with a back-up seal according to an embodiment of the present invention. Notably, low-pressure turbine 120 is associated with engine 100 of FIG. 1.

As shown in FIG. 4, low-pressure turbine 120 defines a primary gas flow path 130 along which multiple rotating blades (e.g., blade 132) and stationary vanes (e.g., vane 134) are located. In this embodiment, the blades are mounted to turbine disks, the respective webs and bores of which extend into a high-pressure cavity 140. For instance, disk 142 includes a web 144 and a bore 146, each of which extends into cavity 140.

A relatively lower-pressure cavity 148 is oriented between high-pressure cavity 140 and turbine hub 149, with a hydrostatic seal 150 being provided to maintain a pressure differential between the high-pressure cavity and the lower-pressure cavity. An intermediate pressure cavity 151 is oriented between high-pressure cavity 140 and lower-pressure cavity 148. Note that the arrows depict representative locations at which the higher-pressure gas attempts to leak from the high-pressure cavity into flow path 130.

As shown in greater detail in FIG. 5, hydrostatic seal 150 is configured as a lift-off seal incorporating a seal face 152 and a seal runner 154. The seal face forms a portion of a seal face assembly 153, which also includes a mounting bracket 155 for removably mounting the assembly.

Seal runner 154 is provided as a portion of a seal runner assembly 160 that includes a mounting bracket 162. Thus, seal 150 is provided as a removable assembly, the location of which can be adjusted axially and radially. Notably, providing a hydrostatic face seal as an adjustable and/or removable assembly can enable thrust balance trimming of the gas turbine engine in which the hydrostatic face seal is installed.

In operation, the seal face intermittently contacts the seal runner. By way of example, contact between the seal face and the seal runner can occur during sub-idle conditions and/or during transient conditions. However, during normal operating conditions, the seal face and the seal runner should not contact each other.

The seal face is positioned by a carrier 166 that can translate axially with respect to mounting bracket 155, which is attached to a non-rotating component of the engine. A biasing member 168 (e.g., a spring) is biased to urge the carrier so that the seal face contacts the seal runner. In operation, contact between the seal face and the seal runner is maintained until gas pressure in the high-pressure cavity is adequate to overcome the biasing force, thereby separating the seal face from the seal runner.

Since the embodiment of FIGS. 1, 4 and 5 is configured as a lift-off seal (i.e., at least intermittent contact is expected), materials forming the surfaces that will contact each other are selected, at least in part, for their durability. In this regard, a material comprising carbon can be used as a seal face material. It should be noted, however, that carbon may be susceptible to deterioration at higher temperatures. Therefore, carbon should be used in locations where predicted temperatures are not excessive. By way of example, use of such a material may not be appropriate, in some embodiments, in a high-pressure turbine.

Also shown in FIG. 5 is a back-up seal 170. In this embodiment, the back-up seal is a labyrinth seal, although various other types of seals such as brush seals, for example, could be used in other embodiments.

Back-up seal 170 in this embodiment is configured as a two-step seal, with each step incorporating an abradable seal land such as honeycomb, for example. The lands 172, 174 are supported by an arm 176 that is attached to mounting bracket 155. Thus, the lands of the labyrinth seal are provided as a portion of the seal face assembly. In other embodiments, the steps can be provided as a separate assembly or can be supported by another component, such as a seal runner assembly.

Steps 172, 174 are engaged by corresponding knife edges 182, 184, which are supported by an arm 186. During operation, the knife edges 182, 184 operate in close proximity to the lands 172, 174. This interaction provides a leakage restriction, thus creating a seal. Arm 186 is attached to mounting bracket 162. Thus, the knife edges of the labyrinth seal are provided as a portion of the seal runner assembly 160. In other embodiments, the knife edges can be provided as a separate assembly or can be supported by another component, such as a seal face assembly.

In a normal mode of operation (i.e., when the hydrostatic seal is properly functioning), a nominal pressure differential exists between intermediate pressure cavity 151 and lower-pressure cavity 148. That is, the pressure differential between cavities 140 and 148 is maintained, at least primarily, across the hydrostatic seal 150. However, in a failure mode of operation (i.e., the hydrostatic seal deteriorates or fails), the pressure of the high-pressure cavity 140 is depleted to a level lower than during the normal mode of operation but higher than that of intermediate cavity 151 during normal operation. The increase in pressure differential across the back-up seal 170 is due to the increased flow rate imposed on the back-up seal during failure of the primary seal. Thus, in the failure mode of operation, pressure in intermediate cavity 151 increases and a corresponding pressure differential is maintained, at least primarily, across the back-up seal 170.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, although the embodiments described herein are configured as lift-off seals, other types of seals can be used. All such modifications and variations are intended to be included herein within the scope of this disclosure and protected by the accompanying claims.

The invention claimed is:

1. A seal assembly for a gas turbine engine comprising:
a hydrostatic seal removably mounted within the gas turbine engine by a mounting bracket, the hydrostatic seal having a seal face and a seal runner, wherein the seal face and the mounting bracket comprise a seal face assembly, and wherein the mounting bracket is operative to removably mount the seal face assembly within the gas turbine engine; and
a back-up seal spaced at a distance from the hydrostatic seal by an arm, the back-up seal comprising a separate structure from the hydrostatic seal, wherein the back-up seal forms an outlet and the hydrostatic seal forming an inlet of a cavity formed by the mounting bracket and the arm, wherein the back-up seal is labyrinth seal having a land and a knife edge, the knife edge being operative to interact with the land to form a seal, and wherein one of the land and the knife edge is attached to the mounting bracket of the seal face assembly and the other of the land and the knife edge is attached to the mounting bracket of the seal runner assembly;
wherein, in a normal mode of operation of the hydrostatic seal, interaction of the seal face and the seal runner maintains a pressure differential within the gas turbine engine and, in a failure mode of operation of the hydrostatic seal, the back-up seal maintains a pressure differential within the gas turbine engine.

2. The assembly of claim 1, wherein the hydrostatic seal is a lift-off seal, with the seal face being biased to a contact position in which the seal face contacts the seal runner.

3. The assembly of claim 2, wherein the seal face assembly has a biasing member operative to bias the seal face to the contact position.

4. The assembly of claim 1, wherein at least a portion of the seal face configured to contact the seal runner is formed of a material comprising carbon.

5. A turbine assembly for a gas turbine engine comprising:
a hydrostatic seal removably mounted within a turbine of the gas turbine engine by a mounting bracket, the hydrostatic seal having a seal face and a seal runner, wherein the seal face and the mounting bracket comprise a seal face assembly, and wherein the mounting bracket is operative to removably mount the seal face assembly within the gas turbine engine; and
a back-up seal spaced at a distance from the hydrostatic seal by an arm, the back-up seal comprising a separate structure from the hydrostatic seal, wherein the back-up seal forms an outlet and the hydrostatic seal forming an inlet of a cavity formed by the mounting bracket and the arm, wherein the back-up seal is labyrinth seal having a land and a knife edge, the knife edge being operative to interact with the land to form a seal, and wherein one of the land and the knife edge is attached to the mounting bracket;
wherein, in a normal mode of operation of the hydrostatic seal, interaction of the seal face and the seal runner maintains a pressure differential within the gas turbine engine and, in a failure mode of operation of the hydrostatic seal, the back-up seal maintains a pressure differential within the gas turbine engine.

6. The assembly of claim 5, wherein at least a portion of the seal face configured to contact the seal runner is formed of a material comprising carbon.

7. The assembly of claim 5, wherein the turbine is a low-pressure turbine.

8. The assembly of claim 5, wherein the hydrostatic seal is a lift-off seal, with the seal face being biased to a contact position in which the seal face contacts the seal runner.

9. A gas turbine engine comprising:
a compressor;
a shaft interconnected with the compressor; and
a turbine operative to drive the shaft, the turbine having a hydrostatic seal removably mounted within the turbine by a mounting bracket, the hydrostatic seal having a seal face and a seal runner, and the turbine including a back-up seal spaced at a distance from the hydrostatic seal by an arm, wherein the back-up seal comprises a separate structure from the hydrostatic seal, wherein the back-up seal forms an outlet and the hydrostatic seal forming an inlet of a cavity formed by the mounting bracket and the arm, wherein the seal face and the mounting bracket comprise a seal face assembly, and wherein the mounting bracket is operative to removably mount the seal face assembly within the gas turbine engine, and wherein the back-up seal is labyrinth seal having a land and a knife edge, the knife edge being operative to interact with the land to form a seal, and wherein one of the land and the knife edge is attached to the mounting bracket;
wherein, in a normal mode of operation of the hydrostatic seal, interaction of the seal face and the seal runner maintains a pressure differential within the gas turbine engine and, in a failure mode of operation of the hydrostatic seal, the back-up seal maintains a pressure differential within the gas turbine engine.

10. The engine of claim 9, wherein at least a portion of the seal face configured to contact the seal runner is formed of a material comprising carbon.

11. The engine of claim 9, wherein the turbine is a low-pressure turbine.

* * * * *